US011958926B2

(12) United States Patent
Ono et al.

(10) Patent No.: US 11,958,926 B2
(45) Date of Patent: Apr. 16, 2024

(54) MODIFIED POLYOLEFIN RESIN

(71) Applicant: NIPPON PAPER INDUSTRIES CO., LTD., Kita-ku (JP)

(72) Inventors: Isamu Ono, Tokyo (JP); Kei Kondo, Tokyo (JP); Koji Kimura, Tokyo (JP); Takato Takenaka, Tokyo (JP); Yuuko Nahara, Tokyo (JP); Shunji Sekiguchi, Tokyo (JP)

(73) Assignee: NIPPON PAPER INDUSTRIES CO., LTD., Kita-ku (JP)

( * ) Notice: Subject to any disclaimer, the term of this patent is extended or adjusted under 35 U.S.C. 154(b) by 292 days.

(21) Appl. No.: 17/296,428

(22) PCT Filed: Nov. 26, 2019

(86) PCT No.: PCT/JP2019/046150
§ 371 (c)(1),
(2) Date: May 24, 2021

(87) PCT Pub. No.: WO2020/129551
PCT Pub. Date: Jun. 25, 2020

(65) Prior Publication Data
US 2022/0010048 A1 Jan. 13, 2022

(30) Foreign Application Priority Data

Dec. 21, 2018 (JP) .................. 2018-239142

(51) Int. Cl.
*C08F 255/04* (2006.01)
(52) U.S. Cl.
CPC .................. *C08F 255/04* (2013.01)
(58) Field of Classification Search
CPC .... C08F 255/04; C08F 255/02; C08F 222/06; C08F 220/1812
See application file for complete search history.

(56) References Cited

U.S. PATENT DOCUMENTS

| 4,315,863 | A * | 2/1982 | Tomoshige | ........... C08F 255/00 549/233 |
| 6,914,097 | B2 | 7/2005 | Ward et al. | |
| 2004/0116569 | A1 * | 6/2004 | Ward | ..................... C09J 123/06 524/543 |
| 2010/0197872 | A1 | 8/2010 | Jeon et al. | |
| 2011/0184140 | A1 | 7/2011 | Jeon et al. | |
| 2013/0338284 | A1 * | 12/2013 | Ito | ........................... C08L 51/06 524/364 |
| 2018/0371142 | A1 | 12/2018 | Komoto | |
| 2022/0017671 | A1 * | 1/2022 | Ono | ....................... C08F 255/08 |

FOREIGN PATENT DOCUMENTS

| JP | 10-330561 A | 12/1998 | |
| JP | 2001-114843 A | 4/2001 | |
| JP | 2003-277481 A | 10/2003 | |
| JP | 2005-126483 A | 5/2005 | |
| JP | 2010-523735 A | 7/2010 | |
| JP | 2012-52039 A | 3/2012 | |
| JP | 2014-210842 A | 11/2014 | |
| JP | 2018-135523 A | 8/2018 | |
| JP | 2018-150482 A | 9/2018 | |
| WO | WO 2017/110633 A1 | 6/2017 | |
| WO | WO-2018037849 A1 * | 3/2018 | .............. C08F 10/00 |

OTHER PUBLICATIONS

International Search Report dated Jan. 7, 2020 in PCT/JP2019/046150 filed on Nov. 26, 2019, 2 pages.
De Roover et al., "Molecular Characterization of Maleic Anhydride-Functionalized Polypropylene", Journal of Polymer Science: Part A: Polymer Chemistry, 1995, vol. 33, pp. 829-842.
Office Action dated Nov. 1, 2022, in corresponding Japanese Patent Application No. 2018-2353142 (with English Translation), 3 pages.

* cited by examiner

*Primary Examiner* — Mark S Kaucher
(74) *Attorney, Agent, or Firm* — Oblon, McClelland, Maier & Neustadt, L.L.P.

(57) ABSTRACT

A modified polyolefin resin having an intended adhesion strength to various substrates even when graft modification may be carried out by using an α,β-unsaturated carboxylic acid derivative having a cyclic structure. The modified polyolefin resin may be a modified product of a polyolefin resin and satisfies conditions (A) to (C): condition (A)—a modifying component includes an α,β-unsaturated carboxylic acid derivative having a cyclic structure; condition (B)—a ring-opening degree expressed by formula (1) is 40 or more; and condition (C)—the polyolefin resin includes an ethylene structural unit, $$\text{ring-opening degree} = \text{modification degree } K \times \text{ring-opening rate } R \quad (1)$$

wherein, in the formula (1), the modification degree K is a grafting weight (wt. %) of the α,β-unsaturated carboxylic acid derivative, and the ring-opening rate R is a ring-opening rate (%) of the cyclic structure in the α,β-unsaturated carboxylic acid derivative.

19 Claims, No Drawings

MODIFIED POLYOLEFIN RESIN

CROSS-REFERENCE TO RELATED APPLICATIONS

The present application is the national stage of international application PCT/JP2019/046150, filed on Nov. 26, 2019, and claims the benefit of the filing date of Japanese Appl. No. 2018-239142, filed on Dec. 21, 2018.

FIELD

The present invention relates to a modified polyolefin resin.

BACKGROUND

Polyolefin resins such as polypropylene and polyethylene are excellent in mechanical properties such as a tensile strength, a tear strength, and an impact strength, as well as in a water resistance and a chemical resistance. In addition, polyolefin resins are not only light and cheap but also excellent in various properties such as moldability. Therefore, polyolefin resins are used in various uses such as a sheet, a film, and a molded article. On the other hand, unlike acryl resins and polyester resins, these polyolefin resins are nonpolar and have high crystallinity; thus, they have drawbacks that painting and adhesion thereof are difficult.

A chlorinated polyolefin resin is widely used as a polyolefin resin whose adhesion property to a nonpolar resin substrate is improved. However, the chlorinated polyolefin resin is considered improper for adhesion between a polyolefin resin and a metal because it has the problem that hydrochloric acid is released.

Therefore, for adhesion between a polyolefin resin and a metal, an acid-modified polyolefin resin based on a non-aqueous dispersion type is generally used.

On top of this, in recent years, uses requiring a high heat resistance are increasing. In order to meet this requirement, use of a resin having a comparatively high melting point has been known (for example, see Patent Literature 1). According to the technology described in Patent Literature 1, including a high melting point resin can enhance heat resistance, but this causes deterioration in solution stability under a certain circumstance. Therefore, a modified polyolefin resin that is heat resistant and has an excellent solution stability has been proposed (for example, see Patent Literature 2).

CITATION LIST

Patent Literature

Patent Literature 1: Japanese Patent Application Laid-open No. 2014-210842
Patent Literature 2: Japanese Patent Application Laid-open No. 2018-150482

Non-Patent Literature

Non-patent Literature 1: B. De Roover et al., "Molecular characterization of maleic anhydride-functionalized polypropylene", Journal of Polymer Science, Vol. 33, Issue 5, pp. 829-842 (1995)

SUMMARY

Technical Problem

The modified polyolefin resin described in Patent Literature 2 is graft-modified by an α,β-unsaturated carboxylic acid anhydride such as maleic anhydride.

It has been known that graft-modification using an unsaturated carboxylic acid such as maleic anhydride or an anhydride monomer thereof causes degradation of the polymer (decrease in molecular weight) (for example, see Non-patent Literature 1), thereby in turn causing deterioration in an adhesion strength under a certain circumstance.

An object of the present invention is to provide a modified polyolefin resin having an intended adhesion strength to various substrates even when graft modification is carried out by using an α,β-unsaturated carboxylic acid derivative having a cyclic structure.

Solution to Problem

The inventors of the present invention carried out an extensive investigation to achieve this object. As a result, in a modified polyolefin resin that is an ethylene-propylene copolymer modified with an α,β-unsaturated carboxylic acid derivative having a cyclic structure, they found that the object could be achieved by specifying a numerical value of a ring-opening degree with a prescribed numeral formula. The present invention was completed on the basis of this finding.

Namely, the present invention provides the following [1] to [4].

[1] A modified polyolefin resin, the modified polyolefin resin being a modified product of a polyolefin resin and satisfying following conditions (A) to (C):
condition (A): a modifying component comprises an α,β-unsaturated carboxylic acid derivative having a cyclic structure;
condition (B): a ring-opening degree expressed by following formula (1) is 40 or more; and
condition (C): the polyolefin resin comprises an ethylene structural unit, $$\text{Ring-opening degree} = \text{modification degree } K \times \text{ring-opening rate } R \quad (1):$$

(in the formula (1), the modification degree K represents a grafting weight (% by weight) of the α,β-unsaturated carboxylic acid derivative, and the ring-opening rate R represents a ring-opening rate (%) of the cyclic structure in the α,β-unsaturated carboxylic acid derivative).

[2] The modified polyolefin resin according to [1], wherein the ethylene structural unit in the polyolefin resin has a content of 1 to 50% by mole.

[3] The modified polyolefin resin according to [1] or [2], wherein the modified polyolefin resin has a melting point of 50° C. or higher.

[4] The modified polyolefin resin according to any one of [1] to [3], wherein the modified polyolefin resin has a weight-average molecular weight of 10,000 or more.

Advantageous Effects of Invention

In the modified polyolefin resin according to the present invention, even when graft modification is carried out by using an α,β-unsaturated carboxylic acid derivative having a cyclic structure, an intended adhesion strength to various substrates can be obtained.

DESCRIPTION OF EMBODIMENTS

Hereinafter, the present invention will be specifically explained on the basis of preferred embodiments. In this specification, "AA to BB" means AA or more and BB or less. "Melting point" is a value obtained by measurement with a differential scanning calorimeter (hereinafter, this is described as "DSC"). "Weight-average molecular weight" is the value in terms of a standard polystyrene obtained by measurement with a gel permeation chromatography (GPC).

[Modified Polyolefin Resin]

The modified polyolefin resin according to the present invention is a modified product of a polyolefin resin and satisfies the following conditions (A) to (C):

condition (A): a modifying component includes an $\alpha,\beta$-unsaturated carboxylic acid derivative having a cyclic structure;

condition (B): a ring-opening degree expressed by the following formula (1) is 40 or more; and condition (C): the polyolefin resin includes an ethylene structural unit, $$\text{Ring-opening degree} = \text{modification degree } K \times \text{ring-opening rate } R \quad (1)$$

(in the formula (1), the modification degree K represents a grafting weight (% by weight) of the $\alpha,\beta$-unsaturated carboxylic acid derivative, and the ring-opening rate R represents a ring-opening rate (%) of the cyclic structure in the $\alpha,\beta$-unsaturated carboxylic acid derivative).

Because the modified polyolefin resin satisfies the condition (A), this has a structure in which the $\alpha,\beta$-unsaturated carboxylic acid derivative having a cyclic structure is graft-polymerized to the polyolefin resin.

Because the modified polyolefin resin satisfies the condition (B), this has a structure in which at least part of the $\alpha,\beta$-unsaturated carboxylic acid derivative having a cyclic structure that is introduced into a polyolefin resin is opened. In the present invention, the cyclic structure in the $\alpha,\beta$-unsaturated carboxylic acid derivative is opened by a water molecule. Therefore, the open ring structure has a carboxy group. Namely, in the modified polyolefin resin according to the present invention, the ring-opening degree is a parameter relating to the existing amount of the carboxy group in the modified polyolefin resin.

Because the modified polyolefin resin satisfies the condition (C), the modified polyolefin resin that can have an intended adhesion property to various substrates can be obtained.

The modified polyolefin resin obtained by modifying a polyolefin resin by using an $\alpha,\beta$-unsaturated carboxylic acid derivative having a cyclic structure such as maleic anhydride has been known. However, the heretofore known modified polyolefin resin is the one that utilizes in a chemical reaction the cyclic structure of the $\alpha,\beta$-unsaturated carboxylic acid derivative that is introduced into the polyolefin resin so as to express various effects. Therefore, it is preferable that the cyclic structure in the $\alpha,\beta$-unsaturated carboxylic acid derivative that is introduced into the polyolefin is not opened. In other words, the ring-opening degree thereof is preferably as low as possible.

On the other hand, in the modified polyolefin resin according to the present invention, the ring-opening degree of the cyclic structure of the $\alpha,\beta$-unsaturated carboxylic acid derivative that is introduced into the polyolefin is set to a specific numerical value or more. In other words, the ring-opening degree is set to a high value.

The ring-opening degree of the modified polyolefin resin according to the present invention is 40 or more, while preferably 50 or more. When the ring-opening degree is 40 or more, an intended adhesion strength can be obtained even when a graft polymerization is carried out by using the $\alpha,\beta$-unsaturated carboxylic acid derivative having a cyclic structure. The upper limit thereof is preferably 750 or less, while more preferably 700 or less.

Here, the ring-opening degree is defined as a product of the modification degree K and the ring-opening rate R. Details of the modification degree K and the ring-opening rate R are explained below.

The modification degree K represents a grafting weight (% by weight) of the $\alpha,\beta$-unsaturated carboxylic acid derivative. Namely, the modification degree K indicates the rate of the $\alpha,\beta$-unsaturated carboxylic acid derivative having a cyclic structure that is introduced into the polyolefin resin. The modification degree K can be determined in accordance with the ring-opening degree of the modified polyolefin resin. The modification degree K is preferably 0.1 to 20.0% by weight, more preferably 0.2 to 10.0% by weight, and even more preferably 1.0 to 10.0% by weight.

The modification degree K can be controlled by, among other things, a modifying component, the use amount of a radical generating agent, a reaction temperature, a reaction time, and the like at the time when the polyolefin resin is modified with a modifying component.

The modification degree K can be calculated as follows by the method in accordance with JIS K-0070 (1992). Namely, about 0.5 g of an accurately weighed amount of a modified polyolefin resin and about 100 g of toluene are charged into a 300-mL separable flask equipped with a cooling tube and a thermometer; and then, this is dissolved with stirring and heating on a hot stirrer in such a way as to bring the temperature inside the flask to 80° C. After the resin is dissolved, 15 mL of methanol and 5 to 6 droplets of an indicator (1% phenolphthalein-methanol solution) are added; and then, this is titrated with a 0.1 mol/L potassium hydroxide-ethanol solution. From the titration amount required for neutralization here, the modification degree K of the modified polyolefin resin can be calculated by using the following formula.

$$K = \{B \times f \times F/(S \times 1{,}000)\} \times 100$$

K indicates the modification degree (% by weight), B indicates the titration amount (mL) of the potassium hydroxide-ethanol solution, f indicates a factor of the 0.1 mol/L potassium hydroxide-ethanol solution, F indicates a formula weight of the $\alpha,\beta$-unsaturated carboxylic acid derivative multiplied with $1/10$, and S indicates the weight (g) of the modified polyolefin resin.

The modification degrees K in Examples to be described later are the values calculated by this method.

The ring-opening rate R represents a ring-opening rate (%) of the cyclic structure in the $\alpha,\beta$-unsaturated carboxylic acid derivative. Namely, the ring-opening rate R represents a ring-opening rate of the $\alpha,\beta$-unsaturated carboxylic acid derivative having a cyclic structure that is introduced into the polyolefin resin. The ring-opening rate R can be set in accordance with the ring-opening degree of the modified polyolefin resin. The ring-opening rate R is preferably 10 to 80%, while more preferably 15 to 75%.

The ring-opening rate R can be controlled, for example, with variously changing a temperature and a time, by soaking the modified polyolefin resin in water, by putting the modified polyolefin resin under a constant humidity condition, or the like.

The detail of measurement of the ring-opening rate R is as follows.

The modified polyolefin resin is dissolved into an organic solvent to obtain a solution. This solution is applied onto a KBr plate, and dried to form a thin film; and then, an infrared absorption spectrum of this film from 400 to 4,000 cm$^{-1}$ is observed with FT-IR (for example, "FT/IR-4100"; manufactured by JASCO Corp.). Analysis thereof can be done by a software attached to the instrument (for example, "Spectro Manager"; manufactured by JASCO Corp.).

The peak appeared at the wavenumber of 1,700 to 1,750 cm$^{-1}$ is assigned to a peak originated from a carbonyl group in the ring-opened α,β-unsaturated carboxylic acid derivative, and the peak height thereof is designated by A. The peak appeared at the wavenumber of 1,750 to 1,820 cm$^{-1}$ is assigned to a peak originated from a carbonyl group in the ring-unopened α,β-unsaturated carboxylic acid derivative, and the peak height thereof is designated by B. The ring-opening rate R (%) can be calculated by substituting values of respective peak heights in the formula (A/(A+B)×100).

The ring-opening rates R in Examples to be described later are the values calculated by this method.

The melting point of the modified polyolefin resin according to the present invention is preferably 50 to 120° C., while more preferably 60 to 110° C. When the melting point is 50° C. or higher, the adhesion property thereof can be sufficiently expressed. On the other hand, when the melting point is 120° C. or lower, the adhesion property at low temperature and the solution stability are so good that the storage stability at low temperature can be sufficiently expressed.

The melting point can be controlled, for example, by a kind of the base resin of the polyolefin resin.

The detail of the measurement of the melting point by DSC is as follows. In accordance with the method described in JIS K7121 (1987), by using a DSC measurement instrument (for example, "DISCOVERY DSC2500": manufactured by TA Instruments Japan Inc.), about 5 mg of a sample is kept under a molten state by heating at 150° C. for 10 minutes. This is cooled at the temperature descending rate of 10° C./minute, and is stably retained at −50° C. for 5 minutes. Then, this is heated at the temperature ascending rate of 10° C./minute till 150° C. to measure a melting peak temperature at the time of melting. This temperature is taken as the melting point.

The melting points in Examples to be described later are the values calculated by this method.

The weight-average molecular weight of the modified polyolefin resin according to the present invention is preferably 10,000 to 200,000, while more preferably 20,000 to 180,000.

The weight-average molecular weight thereof can be controlled, for example, by the weight-average molecular weight of the base resin of the polyolefin resin and the use amount of the modifying component.

Detail of the measurement condition of GPC is as follows.
Measurement instrument: HLC-8320 GPC (manufactured by Tosoh Corp.)
Eluting solution: tetrahydrofuran
Column: TSKgel (manufactured by Tosoh Corp.)
Standard substance: polystyrene (manufactured by Tosoh Corp. and GL Sciences Inc.)
Detector: differential refractometer (manufactured by Tosoh Corp.)

The weight-average molecular weights of the modified polyolefin resins in Examples to be described later are the values measured with this condition.

(Polyolefin Resin)

The polyolefin resin includes an ethylene structural unit. The polyolefin resin may include a structural unit other than the ethylene structural unit (hereinafter, this unit is also called "other structural unit"). Illustrative examples of the other structural unit include an octene structural unit, a butene structural unit, a propylene structural unit, a pentene structural unit, a hexene structural unit, a heptene structural unit, a styrene structural unit, a cyclopentene structural unit, and a norbornene structural unit.

Preferably, the polyolefin resin includes at least one structural unit selected from the group consisting of an octene structural unit, a butene structural unit, a propylene structural unit, a pentene structural unit, a hexene structural unit, a heptene structural unit, a styrene structural unit, a cyclopentene structural unit, and a norbornene structural unit.

As the polyolefin resin, a domestic product may be used, or a commercially available product may be used. When this is produced domestically, a heretofore known method using a catalyst such as a metallocene catalyst may be used. Illustrative examples of the commercially available product include "Kernel (registered trade mark)" and "Novatec (registered trade mark)" (both are manufactured by Japan Polyethylene Corp.); "Tafmer (registered trade mark)" and "Excerex (registered trade mark)" (both are manufactured by Mitsui Chemical Corp.); and "Umerit (registered trade mark)" (manufactured by Ube-Maruzen Polyethylene Co., Ltd.).

The lower limit of the content of the ethylene structural unit in the polyolefin resin is preferably 1% or more by mole, while more preferably 5% or more by mole. When the content of the ethylene structural unit is 1% or more by mole, the adhesion property of the modified polyolefin resin thereby obtained with a non-polar substrate such as a polyolefin substrate including a polyethylene substrate is excellent. The upper limit thereof is preferably 50% or less by mole, while more preferably 40% or less by mole. When the content of the ethylene structural unit is 50% or less by mole, the solution stability thereof is excellent.

In one embodiment, the content of the ethylene structural unit in the polyolefin resin is preferably 1 to 50% by mole, while more preferably 5 to 40% by mole.

The upper limit of the content of the other structural unit in the polyolefin resin is preferably 99% or less by mole, while more preferably 95% or less by mole. When the content of the other structural unit is 99% or less by mole, the adhesion property of the modified polyolefin resin thereby obtained with a non-polar substrate such as a polyolefin substrate including a polyethylene substrate is excellent. The lower limit thereof is preferably 50% or more by mole, while more preferably 60% or more by mole. When the content of the other structural unit is 50% or more by mole, the solution stability thereof is excellent.

In one embodiment, the content of the other structural unit in the polyolefin resin is preferably 50 to 99% by mole, while more preferably 60 to 95% by mole.

Contents of these structural units in the polyolefin resin can be calculated from the amounts of the monomers used in preparation of the polyolefin resin. Alternatively, these can be calculated by analysis of NMR of the polyolefin resin. Here, the contents of the structural units calculated from the amounts of the monomers used in preparation of the polyolefin resin usually are the same values as the contents of the structural units calculated by analysis of NMR.

When the polyolefin resin that is commercially available is used, these contents may be judged from the product information.

The lower limit of the melting point of the polyolefin resin is preferably 50° C. or higher, while more preferably 60° C. or higher. When the melting point of the polyolefin resin is 50° C. or higher, this can sufficiently express a coat film strength upon using the modified polyolefin resin for an ink, a paint, or the like. Therefore, a sufficient adhesion property to a substrate can be expressed. When this is used as an ink, blocking can be suppressed during printing. The upper limit thereof is preferably 120° C. or lower, while more preferably 110° C. or lower. When the melting point of the polyolefin resin is 120° C. or lower, the coat film can be suppressed from excessive hardening upon using the modified polyolefin resin for an ink, a paint, or the like. Therefore, the coat film can express a suitable flexibility.

In one embodiment, the melting point of the polyolefin resin is preferably 50 to 120° C., while more preferably 60 to 110° C.

The melting point of the polyolefin resin can be measured by using the DSC measurement instrument (for example, "DISCOVERY DSC2500": manufactured by TA Instruments Japan Inc.). More specifically, about 5 mg of a sample is melted at 150° C. for 10 minutes, and then, this is cooled at the temperature descending rate of 10° C./minute till −50° C. to crystallize. Then, this is heated at the temperature ascending rate of 10° C./minute till 150° C. to melt. A melting peak temperature at the time of melting can be obtained as the melting point.

The weight-average molecular weight of the polyolefin resin may be appropriately set in accordance with the weight-average molecular weight of the modified polyolefin resin. For example, when the weight-average molecular weight of the modified polyolefin resin is preferably 10,000 to 200,000, while more preferably 20,000 to 180,000, preferably the weight-average molecular weight of the polyolefin resin is controlled in such a way as to bring the weight-average molecular weight of the modified polyolefin resin thereby obtained into this range. More specifically, it is preferable to control the weight-average molecular weight of the polyolefin resin in such a way as to bring into a suitable range, for example, 200,000 or less, by degrading thereof in the presence of a heat or a radical.

Here, the weight-average molecular weight of the polyolefin resin is the value measured by using the gel permeation chromatography (GPC, standard substance: polystyrene) with a similar manner described before. The measurement conditions are the same as those described before.

The weight-average molecular weights of the polyolefin resins in Examples to be described later are the values measured with this condition.

(Modifying Component)

The modifying component includes the α,β-unsaturated carboxylic acid derivative having a cyclic structure. Illustrative examples of the α,β-unsaturated carboxylic acid derivative having a cyclic structure include α,β-unsaturated carboxylic acid anhydrides having a cyclic structure, such as maleic anhydride, citraconic anhydride, itaconic anhydride, and aconitic anhydride. Among these, maleic anhydride is preferable.

The modifying component may include components other than the α,β-unsaturated carboxylic acid derivative having a cyclic structure. Illustrative examples thereof include α,β-unsaturated carboxylic acids such as maleic acid, fumaric acid, citraconic acid, mesaconic acid, itaconic acid, and aconitic acid; (meth)acrylate esters such as methyl (meth)acrylate, ethyl (meth)acrylate, n-butyl (meth)acrylate, cyclohexyl (meth)acrylate, hydroxyethyl (meth)acrylate, isobornyl (meth)acrylate, glycidyl (meth)acrylate, octyl (meth)acrylate, lauryl (meth)acrylate, tridecyl (meth)acrylate, stearyl (meth)acrylate, benzyl (meth)acrylate, phenyl (meth)acrylate, dimethylaminoethyl (meth)acrylate, diethylaminoethyl (meth)acrylate, 2-hydroxyethyl (meth)acrylate, N,N-dimethylaminoethyl (meth)acrylate, and acetoacetoxyethyl (meth)acrylate; and monomethyl fumarate, monoethyl fumarate, monopropyl fumarate, monobutyl fumarate, dimethyl fumarate, diethyl fumarate, dipropyl fumarate, dibutyl fumarate, monomethyl maleate, monoethyl maleate, monopropyl maleate, monobutyl maleate, dimethyl maleate, diethyl maleate, dipropyl maleate, dibutyl maleate, maleimide, and N-phenyl maleimide.

Modification of the polyolefin resin by the modifying component may be done by a heretofore known method. Illustrative examples of the method like this include a method in which the polyolefin resin is melted or dissolved into a solvent, which is then followed by addition of a modifying component and a radical generating agent to carry out the modification.

As for the reaction apparatus, an extruding machine such as a biaxial extruder may be used.

The reaction may be carried out with any of a batch-wise system and a continuous system.

When the polyolefin resin is modified with the modifying component, usually, a graft polymer having a polyolefin as a main chain and a composition unit derived from the modifying component as a side chain can be obtained.

[Production Method]

The method for producing the modified polyolefin resin according to the present invention is not particularly restricted. One example thereof is described below.

First, a polyolefin resin is prepared. This polyolefin resin can be prepared by polymerizing ethylene and an α-olefin such as propylene, 1-butene, 1-pentene, 1-hexene, 1-heptene, or 1-octene in the presence of a catalyst such as a Ziegler-Natta catalyst or a metallocene catalyst. A commercially available polyolefin resin may be used as well.

Next, the polyolefin resin is modified by using the modifying component. The modification may be done by a heretofore known modification method such as, for example, a graft polymerization method. Upon carrying out the graft polymerization reaction, a radical generating agent may be used. Illustrative examples of the method to obtain the modified polyolefin resin include: a solution method in which the modifying component is dissolved by heating into a solvent such as toluene followed by addition of the radical generating agent to the resulting mixture; and a melt kneading method in which the modifying component and the radical generating agent are added into a machine such as a Banbury mixer, a kneader, or an extruder thereby kneading them in the machine. Here, the modifying component may be added all at once or consecutively.

Upon carrying out the graft polymerization reaction, in view of grafting with a suitable amount, the amount of the modifying component is preferably 0.1 to 20 parts by mass relative to 100 parts by mass of the polyolefin resin.

The radical generating agent that can be used may be arbitrarily selected from heretofore known radical generating agents. Among these, an organic peroxide compound is preferable. Illustrative examples of the organic peroxide compound include di-t-butyl peroxide, dicumyl peroxide, t-butylcumyl peroxide, benzoyl peroxide, dilauryl peroxide, cumene hydroperoxide, t-butyl hydroperoxide, 1,1-bis(t- butylperoxy)-3,5,5-trimethylcyclohexane, 1,1-bis(t-butylperoxy)-cyclohexane, cyclohexanone peroxide, t-butylperoxy benzoate, t-butylperoxy isobutyrate, t-butylperoxy-3,5,5-trimethyl hexanoate, t-butylperoxy-2-ethyl hexanoate, t-butylperoxy isopropyl carbonate, cumylperoxy octoate, and 2,5-dimethyl-2,5-bis(t-butylperoxy)hexane. Among these, di-t-butyl peroxide, dilauryl peroxide, and 2,5-dimethyl-2,5-bis(t-butylperoxy)hexane are preferable.

A preferable range of the addition amount of the radical generating agent relative to 100% by mass of the modifying component is as follows. The lower limit of the addition amount thereof is preferably 1% or more by mass, while more preferably 10% or more by mass. When the addition amount of the radical generating agent is 1% or more by mass, the grafting efficiency can be retained. On the other hand, the upper limit of the addition amount is preferably 200% or less by mass, while more preferably 100% or less by mass. When the addition amount of the radical generating agent is 200% or less by mass, this is economical.

Unreacted substance, i.e., the modifying component not involved in the graft polymerization to the polyolefin resin, may be removed by extraction with, for example, a poor solvent. In the way as described above, the graft polymer can be obtained.

The modified polyolefin resin according to the present invention can be produced by causing the thus obtained graft polymer to react with a water molecule in such a way as to satisfy the condition (B). More specifically, this can be produced by opening of the ring. This ring opening may be done, for example, by soaking the modified polyolefin resin in water, or putting the modified polyolefin resin under a constant humidity condition. At this time, the ring-opening rate (%) and the ring-opening degree can be controlled by changing the water temperature as well as the temperature and humidity in the process condition, and also by changing the soaking time and the period during which the modified polyolefin resin is put under a constant humidity condition.

The modified polyolefin resin according to the present invention is useful as an intermediate medium for a substrate having a difficulty to be applied with a paint or the like because of a poor attaching property (adhesion property). Therefore, this can be used as an adhesive to adhere polyolefin type substrates having a poor attaching property (adhesion property) to each other, such as polypropylene and polyethylene. Here, this can be used for the substrate regardless of whether the surface thereof is treated with plasma, corona, or the like. In addition, when the modified polyolefin resin according to the present invention is laminated onto the surface of the polyolefin type substrate by a hot-melt method followed by coating thereon with a paint or the like, an adhesion stability or the like of the paint may be enhanced.

In addition, the modified polyolefin resin according to the present invention can express a superior adhesion property between a metal and a resin. Illustrative examples of the metal include aluminum, an aluminum alloy, nickel, and a stainless steel. Illustrative examples of the resin include non-polar resins such as polyolefin resins, as well as polyurethane type resins, polyamide type resins, acrylic resins, polyester type resins, and polyethylene terephthalate type resins. Therefore, the modified polyolefin resin according to the present invention can be used as an adhesive, a primer, a paint binder, and an ink binder, or as a component included therein.

[Composition]

The modified polyolefin resin according to the present invention is usually used as a composition that includes the modified polyolefin resin. Preferably, the composition further includes, besides the modified polyolefin resin, at least one ingredient selected from the group consisting of a solution, a curing agent, and an adhesive component.

Solution

One embodiment of the composition is a resin composition that includes the modified polyolefin resin and a solution. Illustrative examples of the solution include an organic solvent. Illustrative examples of the organic solvent include aromatic solvents such as toluene and xylene; ester solvents such as ethyl acetate and butyl acetate; ketone solvents such as methyl ethyl ketone, methyl butyl ketone, and ethyl cyclohexanone; and aliphatic or alicyclic hydrocarbon solvents such as cyclohexane, methyl cyclohexane, nonane, and decane. In view of an environmental concern, organic solvents other than aromatic solvents are preferable, while a mixed solvent of an alicyclic hydrocarbon solvent with an ester solvent or with a ketone solvent is more preferable.

These organic solvents may be used singly or as a mixed solvent of two or more of them.

In addition, in order to enhance a storage stability of the resin composition solution that includes the modified polyolefin resin and the solution, alcohols (for example, methanol, ethanol, propanol, isopropyl alcohol, and butanol), and propylene type glycol ethers (for example, propylene glycol methyl ether, propylene glycol ethyl ether, and propylene glycol t-butyl ether) may be used singly or as a mixture of two or more of them. In this case, the addition amount thereof is preferably 1 to 20% by mass relative to the organic solvent described before.

(Curing Agent)

Another embodiment of the composition is a composition that includes the modified polyolefin resin and a curing agent. Illustrative examples of the curing agent include polyisocyanate compounds, epoxy compounds, polyamine compounds, polyol compounds, and crosslinking agents having these functional groups that are blocked by a protecting group.

The curing agent may be used singly or as a combination of a plurality of these curing agents.

The blending amount of the curing agent can be arbitrarily selected in accordance with the modification degree K of the modified polyolefin resin. When the curing agent is blended thereto, a catalyst such as an organic tin compound or a tertiary amine compound may be concurrently used in accordance with the purpose thereof.

(Adhesive Component)

Still another embodiment of the composition is a composition that includes the modified polyolefin resin and an adhesive component. A heretofore known adhesive component such as a polyester type adhesive, a polyurethane type adhesive, or an acrylic adhesive may be used so far as the intended effects are not impaired.

The composition is superior in adhesion of non-polar resins such as polyolefin substrates to each other as well as between a non-polar resin and a metal. Therefore, the composition can be used as an adhesive, a primer, a paint binder, and an ink binder; and thus, this is useful as an adhesive in a laminate film such as an aluminum laminate film.

[Primer and Binder]

The modified polyolefin resin according to the present invention or the composition described above can be used as a primer, a paint binder, or an ink binder. The modified polyolefin resin according to the present invention or the composition including this resin has a superior adhesion property, solution stability, and heat resistance. Therefore, they can be suitably used as a primer for over-coating to a polyolefin substrate such as an automobile bumper, and as a paint binder having a superior adhesion with an over-coat paint or with a clear coat.

The primer, the paint binder, or the ink binder may be used in the form corresponding to the use thereof, for example, as in the form of a solution, a powder, or a sheet. In addition, at this time, an additive such as an antioxidant, a light stabilizer, a UV absorber, a pigment, a dye, an inorganic filling material, or the like can be added, as needed.

[Laminate Body]

The modified polyolefin resin according to the present invention or the composition including this may be used as a laminate body. The laminate body usually has a layer including the modified polyolefin resin or the composition described above, a metal layer, and a resin layer. Arrangement of these layers in the laminate body is not particularly restricted; illustrative examples thereof include: an embodiment in which the metal layer and the resin layer are arranged in such a way as to interpose therebetween the layer including the modified polyolefin resin or the layer including the composition; and an embodiment in which there are a first resin layer and a second resin layer that are arranged in such a way as to interpose the metal layer therebetween, whereby the layer including the modified polyolefin resin or the composition is interposed between the metal layer and each of the resin layers. The laminate body may also be used for an exterior material of a lithium ion secondary battery, a condenser, an electric double-layered capacitor, or the like.

EXAMPLES

Hereinafter, the present invention will be explained specifically by Examples. Examples below are described in order to properly explain the present invention, not to limit the present invention. Hereinafter, "part" means part by mass unless otherwise specifically mentioned.

[Contents of each structural unit (% by mole)]: These were measured by using a Nuclear Magnetic Resonance (NMR) instrument. More specifically, about 60 mg of a sample was dissolved in tetrachloroethane (d2). Then, the $^{13}$C-NMR thereof was measured with the following condition, and the contents of the structural units were calculated from integrated values of chain methylene carbon signals.

Measurement range: 250 ppm
Measurement mode: single pulse proton decoupling
Pulse angle: 5.25 microseconds)(45°
Repeat time: 5.5 seconds
Measurement temperature: 120° C.

[Modification degree K (% by weight)]: This was calculated as follows by the method in accordance with JIS K-0070 (1992). Namely, about 0.5 g of an accurately weighed amount of a modified polyolefin resin and about 100 g of toluene were charged into a 300-mL separable flask equipped with a cooling tube and a thermometer; and then, the mixture was dissolved with stirring and heating on a hot stirrer in such a way as to bring the temperature inside the flask to 80° C. After the resin was dissolved, 15 mL of methanol and 5 to 6 droplets of an indicator (1% phenolphthalein-methanol solution) were added, the mixture was titrated for neutralization with a 0.1 mol/L potassium hydroxide-ethanol solution. From the titration amount required for neutralization, the modification degree K in the modified polyolefin resin was calculated by the following formula.

$$K=\{B \times f \times 9.806/(S \times 1{,}000)\} \times 100$$

K indicates the modification degree (% by weight), B indicates the titration amount (mL) of the potassium hydroxide-ethanol solution, f indicates a factor of the 0.1 mol/L potassium hydroxide-ethanol solution, 9.806 indicates a formula weight of maleic anhydride multiplied with 1/10, and S indicates the weight (g) of the modified polyolefin resin.

[Ring-opening rate R (%)]: The modified polyolefin resin was dissolved into an organic solvent to obtain a solution. Next, this solution was applied onto a KBr plate, and dried to form a thin film; and then, an infrared absorption spectrum of this film from 400 to 4,000 cm$^{-1}$ was observed with FT-IR ("FT/IR-4100"; manufactured by JASCO Corp.). Analysis thereof was done by a software attached to the instrument ("Spectro Manager"; manufactured by JASCO Corp.).

The peak appeared at the wavenumber of 1,700 to 1,750 cm$^{-1}$ was assigned to a peak originated from a carbonyl group in the ring-opened α,β-unsaturated carboxylic acid anhydrides, and the peak height thereof was designated by A. The peak appeared at the wavenumber of 1,750 to 1,820 cm$^{-1}$ was assigned to a peak originated from a carbonyl group in the ring-unopened α,β-unsaturated carboxylic acid anhydrides, and the peak height thereof was designated by B. The ring-opening rate R (%) was calculated by substituting values of respective peak heights in the formula (A/(A+B)×100).

[Ring-opening degree]: This was calculated as a product of the modification degree K and the ring-opening rate R.

[Melting point (° C.)]: This was measured in accordance with the method described in JIS K7121 (1987) by using a DSC measurement instrument ("DISCOVERY DSC2500": manufactured by TA Instruments Japan Inc.). More specifically, about 5 mg of a sample was kept under a molten state by heating at 150° C. for 10 minutes. Next, the sample was cooled at the temperature descending rate of 10° C./minute, and was stably kept at −50° C. Then, the sample was heated at the temperature ascending rate of 10° C./minute till 150° C. so as to be melted. A melting peak temperature at the time of melting was measured, and this temperature was taken as the melting point.

[Weight-average molecular weight (Mw)]: This is the value measured with the following measurement condition.

Measurement instrument: HLC-8320 GPC (manufactured by Tosoh Corp.)
Eluting solution: tetrahydrofuran
Column: TSKgel (manufactured by Tosoh Corp.)
Standard substance: polystyrene (manufactured by Tosoh Corp. and GL Sciences Inc.)
Detector: differential refractometer (manufactured by Tosoh Corp.)
Temperature: 40° C.
Flow rate: 1 mL/minute Example 1

By using a biaxial extruder, 100.0 parts of a propylene-ethylene random copolymer [P-E] (89% by mole of propylene component and 11% by mole of ethylene component; Tm=65° C.), 4.0 parts of maleic anhydride, 4.0 parts of lauryl methacrylate, and 2.0 parts of di-t-butyl peroxide were kneaded at 190° C. to carry out the reaction. Degassing in the extruder was carried out by evacuation to remove remaining unreacted substances, and thereby a reaction product having the weight-average molecular weight of 130,000 and Tm=64° C. was obtained. The reaction product was purified by pouring this into a large excess of acetone. The grafting weights of maleic anhydride and lauryl methacrylate in the product were measured to be 3.3% by weight and 2.5% by weight, respectively.

The reaction product was allowed to leave under constant temperature and humidity (50° C. and 100% RH) for 5 hours to obtain a modified polyolefin resin having the ring-opening rate of 23.4%, i.e., 77.2 as the ring-opening degree.

Example 2

The reaction product before adjustment of the ring-opening rate obtained in Example 1 was allowed to leave under constant temperature and humidity (50° C. and 100° RH) for 17 hours to obtain a modified polyolefin resin having the ring-opening rate of 52.0%, i.e., 171.6 as the ring-opening degree.

Example 3

The reaction product before adjustment of the ring-opening rate obtained in Example 1 was allowed to leave under constant temperature and humidity (50° C. and 100% RH) for 48 hours to obtain a modified polyolefin resin having the ring-opening rate of 72.8%, i.e., 240.2 as the ring-opening degree.

Example 4

In a four-neck flask equipped with an agitator, a cooling tube, and a dropping funnel, 100 parts (60 g) of a propylene-ethylene random copolymer [P-E] (88% by mole of propylene component and 12% by mole of ethylene component; Tm=70° C.) was dissolved into 400 g of toluene with heating. While keeping the temperature in the system at 110° C., 10.0 parts of maleic anhydride, 9.0 parts of octyl methacrylate, and 3.0 parts of dilauryl peroxide each were added dropwise for the period of 3 hours with stirring. The reaction was further continued for 1 hour.

After completion of the reaction, the reaction mixture was cooled to room temperature to obtain a reaction product having the weight-average molecular weight of 100,000 and Tm=63° C. The reaction product was purified by pouring this into a large excess of acetone. The grafting weights of maleic anhydride and lauryl methacrylate in the product were measured to be 8.7% by weight and 6.0% by weight, respectively.

The reaction product was allowed to leave under constant temperature and humidity (50° C. and 100% RH) for 5 hours to obtain a modified polyolefin resin having the ring-opening rate of 18.8%, i.e., 163.6 as the ring-opening degree.

Example 5

The reaction product before adjustment of the ring-opening rate obtained in Example 4 was allowed to leave under constant temperature and humidity (50° C. and 100% RH) for 48 hours to obtain a modified polyolefin resin having the ring-opening rate of 70.5%, i.e., 613.4 as the ring-opening degree.

Comparative Example 1

In a four-neck flask equipped with an agitator, a cooling tube, and a dropping funnel, 100 parts (60 g) of a propylene-butene random copolymer [P—B] (80% by mole of propylene component and 20% by mole of butene component; Tm=85° C.) was dissolved into 400 g of toluene with heating. While keeping the temperature in the system at 110° C., 2.0 parts of maleic anhydride, 2.0 parts of lauryl methacrylate, and 0.8 part of di-t-butyl peroxide each were added dropwise for the period of 3 hours with stirring. The reaction was further continued for 1 hour.

After completion of the reaction, the reaction mixture was cooled to room temperature to obtain a reaction product having the weight-average molecular weight of 150,000 and Tm=83° C. The reaction product was purified by pouring this into a large excess of acetone. The grafting weights of maleic anhydride and lauryl methacrylate in the product were measured to be 1.9% by weight and 1.8% by weight, respectively.

The reaction product was allowed to leave under constant temperature and humidity (50° C. and 100% RH) for 5 hours to obtain a modified polyolefin resin having the ring-opening rate of 14.9%, i.e., 28.3 as the ring-opening degree.

Comparative Example 2

The reaction product before adjustment of the ring-opening rate obtained in Comparative Example 1 was allowed to leave under constant temperature and humidity (50° C. and 100% RH) for 16 hours to obtain a modified polyolefin resin having the ring-opening rate of 54.3%, i.e., 103.2 as the ring-opening degree.

Comparative Example 3

The reaction product before adjustment of the ring-opening rate obtained in Comparative Example 1 was allowed to leave under constant temperature and humidity (50° C. and 100% RH) for 48 hours to obtain a modified polyolefin resin having the ring-opening rate of 71.3%, i.e., 135.5 as the ring-opening degree.

Comparative Example 4

By using a biaxial extruder, 100 parts of a propylene-butene random copolymer [P—B] (80° by mole of propylene component and 20% by mole of butene component; Tm=85° C.), 4.5 parts of maleic anhydride, 4.0 parts of lauryl methacrylate, and 1.0 part of di-t-butyl peroxide were kneaded at 180° C. to carry out the reaction. Degassing in the extruder was carried out by evacuation to remove remaining unreacted substances, and thereby a reaction product having the weight-average molecular weight of 160,000 and Tm=82° C. was obtained. The reaction product was purified by pouring this into a large excess of acetone. The grafting weights of maleic anhydride and lauryl methacrylate in the product were measured to be 4.0% by weight and 3.0% by weight, respectively.

The reaction product was allowed to leave under constant temperature and humidity (50° C. and 100% RH) for 5 hours to obtain a modified polyolefin resin having the ring-opening rate of 24.1%, i.e., 96.4 as the ring-opening degree.

Comparative Example 5

The reaction product before adjustment of the ring-opening rate obtained in Comparative Example 4 was allowed to leave under constant temperature and humidity (50° C. and 100% RH) for 18 hours to obtain a modified polyolefin resin having the ring-opening rate of 49.8%, i.e., 199.2 as the ring-opening degree.

Comparative Example 6

The reaction product before adjustment of the ring-opening rate obtained in Comparative Example 4 was allowed to leave under constant temperature and humidity (50° C. and 100% RH) for 48 hours to obtain a modified polyolefin resin having the ring-opening rate of 68.6%, i.e., 274.4 as the ring-opening degree.

The kinds of the base resins, contents of the composition units, the modification degrees K (% by weight), the ring-opening rates R (%), and the ring-opening degrees of the modified polyolefin resins obtained in Examples 1 to 5 and Comparative Examples 1 to 6 are summarized in Table 1.

TABLE 1

|  | Base resin | Content of ethylene structural unit (% by mole) | Content of other structural unit (% by mole) | Modification degree K (% by weight) | Ring-opening rate (%) | Ring-opening degree |
|---|---|---|---|---|---|---|
| Example 1 | P - E | 11 | 89 | 3.3 | 23.4 | 77.2 |
| Example 2 | P - E | 11 | 89 | 3.3 | 52.0 | 171.6 |
| Example 3 | P - E | 11 | 89 | 3.3 | 72.8 | 240.2 |
| Example 4 | P - E | 12 | 88 | 8.7 | 18.8 | 163.6 |
| Example 5 | P - E | 12 | 88 | 8.7 | 70.5 | 613.4 |
| Comparative Example 1 | P - B | 0 | 100 | 1.9 | 14.9 | 28.3 |
| Comparative Example 2 | P - B | 0 | 100 | 1.9 | 54.3 | 103.2 |
| Comparative Example 3 | P - B | 0 | 100 | 1.9 | 71.3 | 135.5 |
| Comparative Example 4 | P - B | 0 | 100 | 4.0 | 24.1 | 96.4 |
| Comparative Example 5 | P - B | 0 | 100 | 4.0 | 49.8 | 199.2 |
| Comparative Example 6 | P - B | 0 | 100 | 4.0 | 68.6 | 274.4 |

[Heat seal strength (gf)]: A solution sample of the modified polyolefin resin prepared as described above (solid portion: 15%, solvent composition: methyl cyclohexane/MEK=80/20 (w/w)) was applied as an adhesive onto a biaxially oriented polypropylene (OPP) sheet or onto a PET film by means of a #10 Meyer bar in such a way as to give a dried resin film thickness of 3 µm, and then, this was dried at room temperature. The OPP sheets or the PET films having been applied with the adhesive were bonded with each other on the applied surfaces of the same sheets or films. Then, this was adhered by hot-pressing with the conditions of temperature, time, and pressure described in Table 2; and then, this was cut out to prepare a specimen having the width of 15 mm. After the specimen was kept under constant temperature and humidity conditions at 23° C. and relative humidity of 50% for 24 hours, the laminate adhesion strength thereof was measured with the peeling angle of 180° and the peeling speed of 100 mm/minute. The results thereof are summarized in Table 2.

TABLE 2

| | Heat seal strength (gf) | | | |
|---|---|---|---|---|
| | 90° C., 2K gf · 10 s | | 140° C., 2K gf · 10 s | |
| | OPP | PET | OPP | PET |
| Example 1 | 300 | 942 | 465 | 835 |
| Example 2 | 295 | 823 | 497 | 734 |
| Example 3 | 247 | 500 | 483 | 291 |
| Example 4 | 290 | 976 | 606 | 807 |
| Example 5 | 230 | 820 | 425 | 1000 |
| Comparative Example 1 | <50 | <50 | 90 | <50 |
| Comparative Example 2 | <50 | <50 | 96 | <50 |
| Comparative Example 3 | <50 | <50 | 110 | <50 |
| Comparative Example 4 | <50 | 52 | <50 | <50 |
| Comparative Example 5 | <50 | 66 | <50 | <50 |
| Comparative Example 6 | <50 | 73 | <50 | <50 |

It can be seen from the results of Comparative Examples 1 to 6 that, when the polyolefin resin not containing the ethylene structural unit is used, the adhesion property of the modified polyolefin resin with a non-polar substrate is poor even when the ring-opening degreed thereof is made high. On the other hand, it can be seen that when the polyolefin resin containing the ethylene structural unit is used, the modified polyolefin resin expresses the excellent adhesion property with both OPP, which is a non-polar substrate, and PET, which is a polar substrate.

The invention claimed is:

1. A modified polyolefin resin, comprising:
a modified product of a polyolefin resin satisfying (A) to (C):
(A) a modifying component comprises (a1) an α,β-unsaturated carboxylic acid derivative having a cyclic structure and (a2) a (meth)acrylate ester;
(B) a ring-opening degree expressed by formula (1) is 40 or more:

$$D_{RO} = K_{MD} \times R_{RO} \quad (1),$$

$D_{RO}$ being ring-opening degree, $K_{MD}$ being a modification degree representing a grafting weight as a weight percentage of the α,β-unsaturated carboxylic acid derivative, and $R_{RO}$ being a ring-opening rate as a percentage of the cyclic structure in the α,β-unsaturated carboxylic acid derivative, $R_{RO}$ being in a range of from 10 to 80%; and
(C) the polyolefin resin comprises an ethylene structural unit.

2. The modified polyolefin resin of claim 1, wherein the ethylene structural unit in the polyolefin resin has a content in a range of from 1 to 50 mol. %.

3. The modified polyolefin resin of claim 1, wherein the modified polyolefin resin has a melting point of 50° C. or higher.

4. The modified polyolefin resin of claim 1, wherein the modified polyolefin resin has a weight-average molecular weight of 10,000 or more.

5. The modified polyolefin resin of claim 1, wherein the α,β-unsaturated carboxylic acid (a1) comprises an α,β-unsaturated carboxylic acid anhydride having a cyclic structure.

6. The modified polyolefin resin of claim 1, wherein the α,β-unsaturated carboxylic acid (a1) comprises maleic anhydride, citraconic anhydride, itaconic anhydride, and/or aconitic anhydride.

7. The modified polyolefin resin of claim 1, wherein the α,β-unsaturated carboxylic acid (a1) comprises maleic anhydride.

8. The modified polyolefin resin of claim 1, wherein the α,β-unsaturated carboxylic acid (a1) comprises citraconic anhydride, itaconic anhydride, and/or aconitic anhydride.

9. The modified polyolefin resin of claim 1, wherein the (meth)acrylate ester (a2) comprises methyl (meth)acrylate, ethyl (meth)acrylate, n-butyl (meth)acrylate, cyclohexyl (meth)acrylate, hydroxyethyl (meth)acrylate, isobornyl (meth)acrylate, glycidyl (meth)acrylate, octyl (meth)acrylate, lauryl (meth)acrylate, tridecyl (meth)acrylate, stearyl (meth)acrylate, benzyl (meth)acrylate, phenyl (meth)acrylate, dimethylaminoethyl (meth)acrylate, diethylaminoethyl (meth)acrylate, 2-hydroxyethyl (meth)acrylate, N,N-dimethylaminoethyl (meth)acrylate, and/or acetoacetoxyethyl (meth)acrylate.

10. The modified polyolefin resin of claim 1, wherein the (meth)acrylate ester (a2) comprises n-butyl (meth)acrylate, cyclohexyl (meth)acrylate, hydroxyethyl (meth)acrylate, isobornyl (meth)acrylate, glycidyl (meth)acrylate, octyl (meth)acrylate, lauryl (meth)acrylate, tridecyl (meth)acrylate, stearyl (meth)acrylate, benzyl (meth)acrylate, phenyl (meth)acrylate, dimethylaminoethyl (meth)acrylate, diethylaminoethyl (meth)acrylate, 2-hydroxyethyl (meth)acrylate, N,N-dimethylaminoethyl (meth)acrylate, and/or acetoacetoxyethyl (meth)acrylate.

11. The modified polyolefin resin of claim 1, wherein the (meth)acrylate ester (a2) comprises methyl (meth)acrylate and/or ethyl (meth)acrylate.

12. The modified polyolefin resin of claim 1, wherein the (meth)acrylate ester (a2) comprises octyl (meth)acrylate, lauryl (meth)acrylate, tridecyl (meth)acrylate, and/or stearyl (meth)acrylate.

13. The modified polyolefin resin of claim 1, wherein the (meth)acrylate ester (a2) comprises lauryl (meth)acrylate and/or stearyl (meth)acrylate.

14. The modified polyolefin resin of claim 1, wherein the modifying component (A) further comprises maleic acid, fumaric acid, citraconic acid, mesaconic acid, itaconic acid, and/or aconitic acid.

15. The modified polyolefin resin of claim 1, wherein the modifying component (A) further comprises monomethyl fumarate, monoethyl fumarate, monopropyl fumarate, monobutyl fumarate, dimethyl fumarate, diethyl fumarate, dipropyl fumarate, dibutyl fumarate, monomethyl maleate, monoethyl maleate, monopropyl maleate, monobutyl maleate, dimethyl maleate, diethyl maleate, dipropyl maleate, dibutyl maleate, maleimide, and/or N-phenyl maleimide.

16. The modified polyolefin resin of claim 1, comprising no chlorinated polyolefin resin.

17. The modified polyolefin resin of claim 1, wherein the modified polyolefin resin has a melting point in a range of from 60 to 120° C.

18. The modified polyolefin resin of claim 1, wherein the ethylene structural unit in the polyolefin resin has a content in a range of from 5 to 40 mol. %.

19. The modified polyolefin resin of claim 1, wherein the modified polyolefin resin has a weight-average molecular weight in a range of from 20,000 to 200,000.

* * * * *